United States Patent [19]

Cahill

[11] Patent Number: 4,890,497
[45] Date of Patent: Jan. 2, 1990

[54] DIFFERENTIAL PRESSURE GAUGE TRANSMITTER

[75] Inventor: John M. Cahill, Michigan City, Ind.

[73] Assignee: Dwyer Instruments, Inc., Michigan City, Ind.

[21] Appl. No.: 236,231

[22] Filed: Aug. 25, 1988

[51] Int. Cl.[4] .................. G01L 9/06; G01L 13/02; G01L 19/04

[52] U.S. Cl. .................. 73/708; 73/721; 73/766; 338/4

[58] Field of Search .............. 73/720, 708, 706, 715, 73/716, DIG. 5, DIG. 4, 721, 726, 727, 766, 862.66; 338/4, 42

[56] References Cited

U.S. PATENT DOCUMENTS

| | | | |
|---|---|---|---|
| 2,722,837 | 11/1955 | Dwyer | 73/407 |
| 3,091,123 | 5/1963 | Locke | 73/407 |
| 3,397,319 | 8/1968 | Locke | 250/231 |
| 3,645,140 | 2/1972 | Phillips et al. | 73/407 R |
| 3,862,416 | 1/1975 | Phillips et al. | 250/231 P |
| 4,011,759 | 3/1977 | Phillips et al. | 73/407 R |
| 4,030,365 | 6/1977 | Phillips et al. | 73/393 |
| 4,347,745 | 9/1982 | Singh | 73/721 |
| 4,385,525 | 5/1983 | Phillips et al. | 73/720 |
| 4,574,640 | 3/1986 | Krechmery | 73/721 |
| 4,718,279 | 1/1988 | Hestich | 73/734 |

*Primary Examiner*—Donald O. Woodiel
*Attorney, Agent, or Firm*—Lee, Mann, Smith, McWilliams & Sweeney

[57] ABSTRACT

For use in a process control current loop including an external electrical power source that is series connected to the transmitter which is in turn connected to a fixed resistance receiver (that may be in the form of a system controller, a computer, a digital readout device, or the like) that in turn is series connected to the electrical power source, with the transmitter being arranged to provide an analog display of differential pressure or pressure sensed by the instrument and also provide for transmission to the receiver of a signal in the 4–20 milliamp range that is proportional to any changes in the differential pressure or pressure sensed by the instrument.

7 Claims, 5 Drawing Sheets

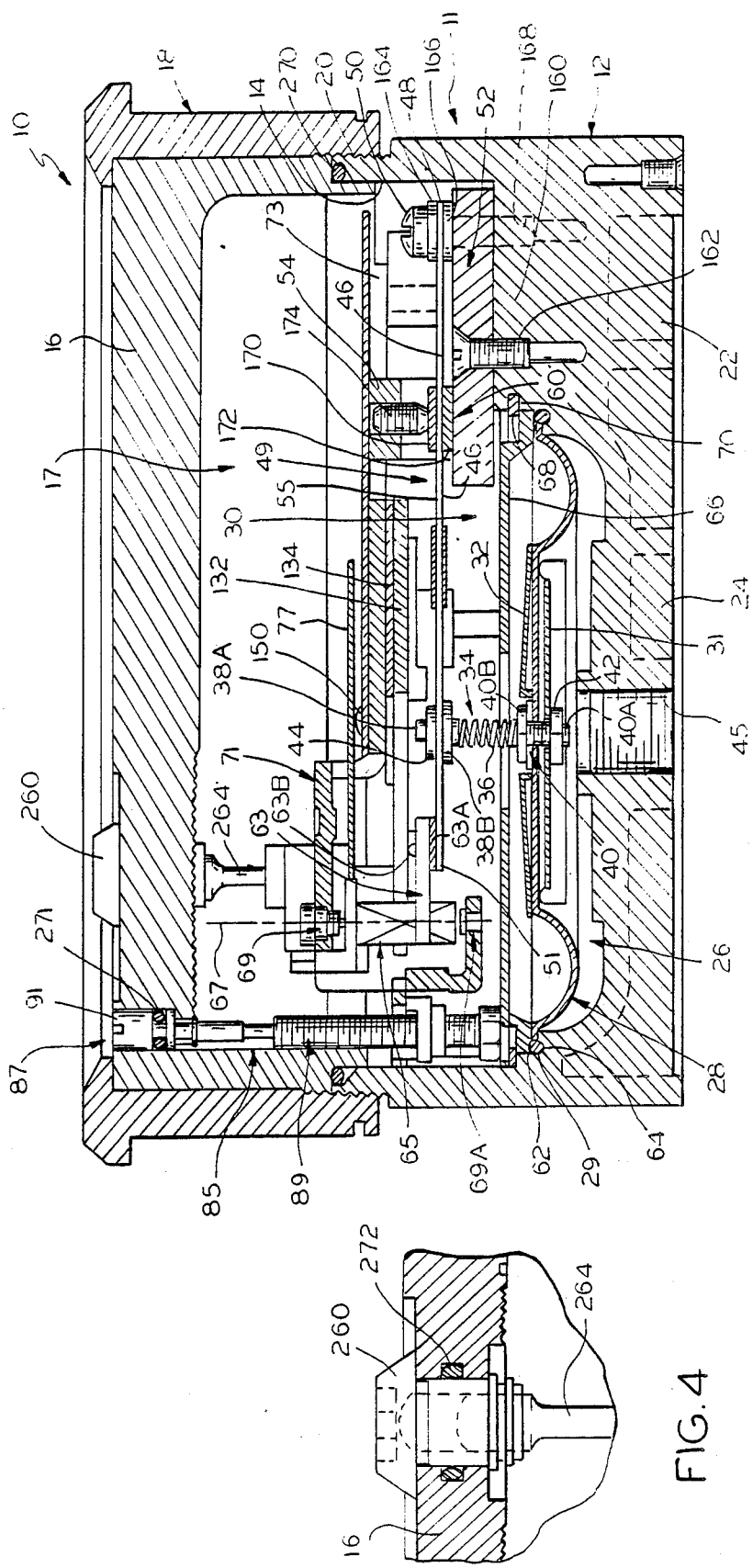

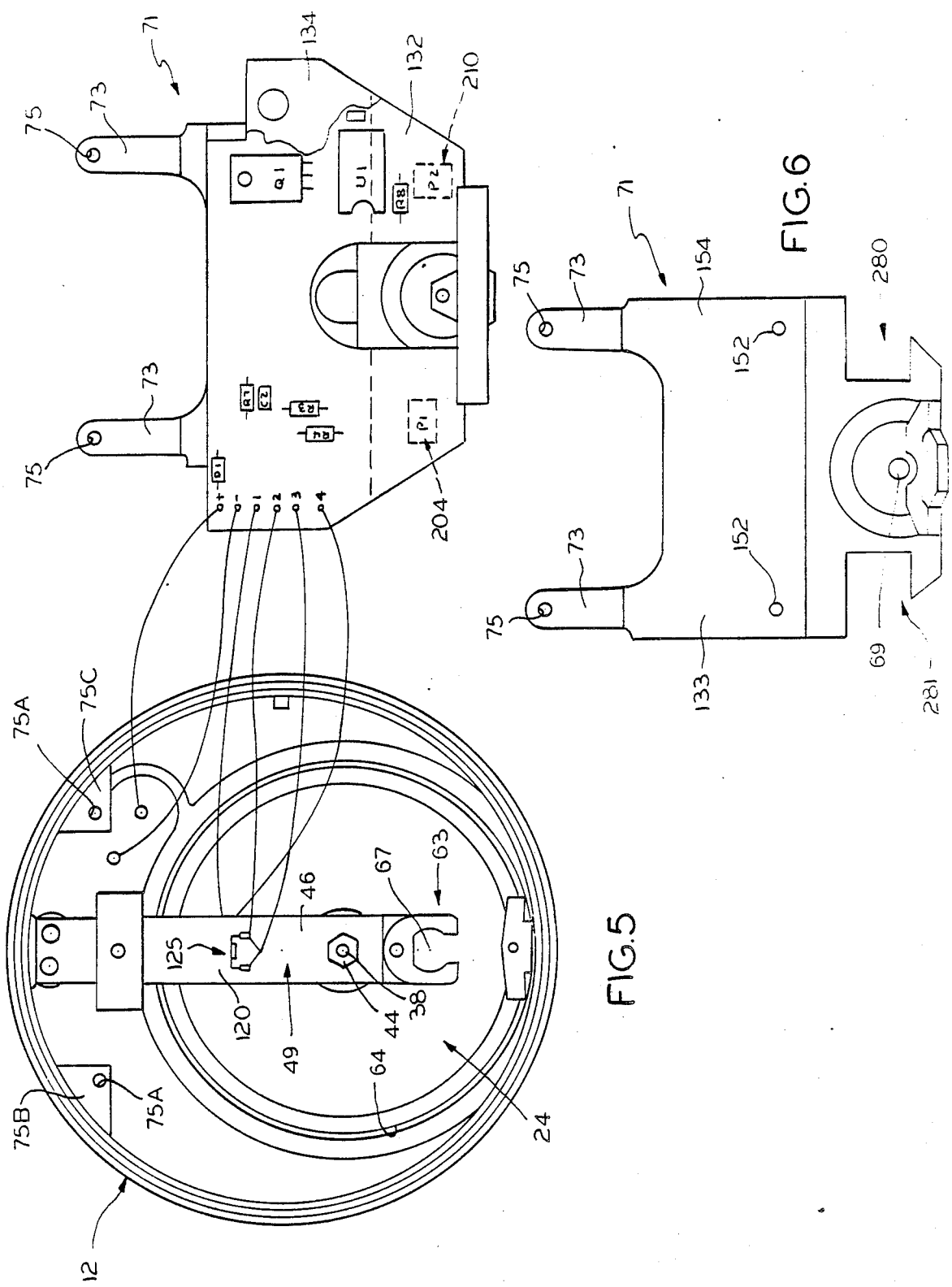

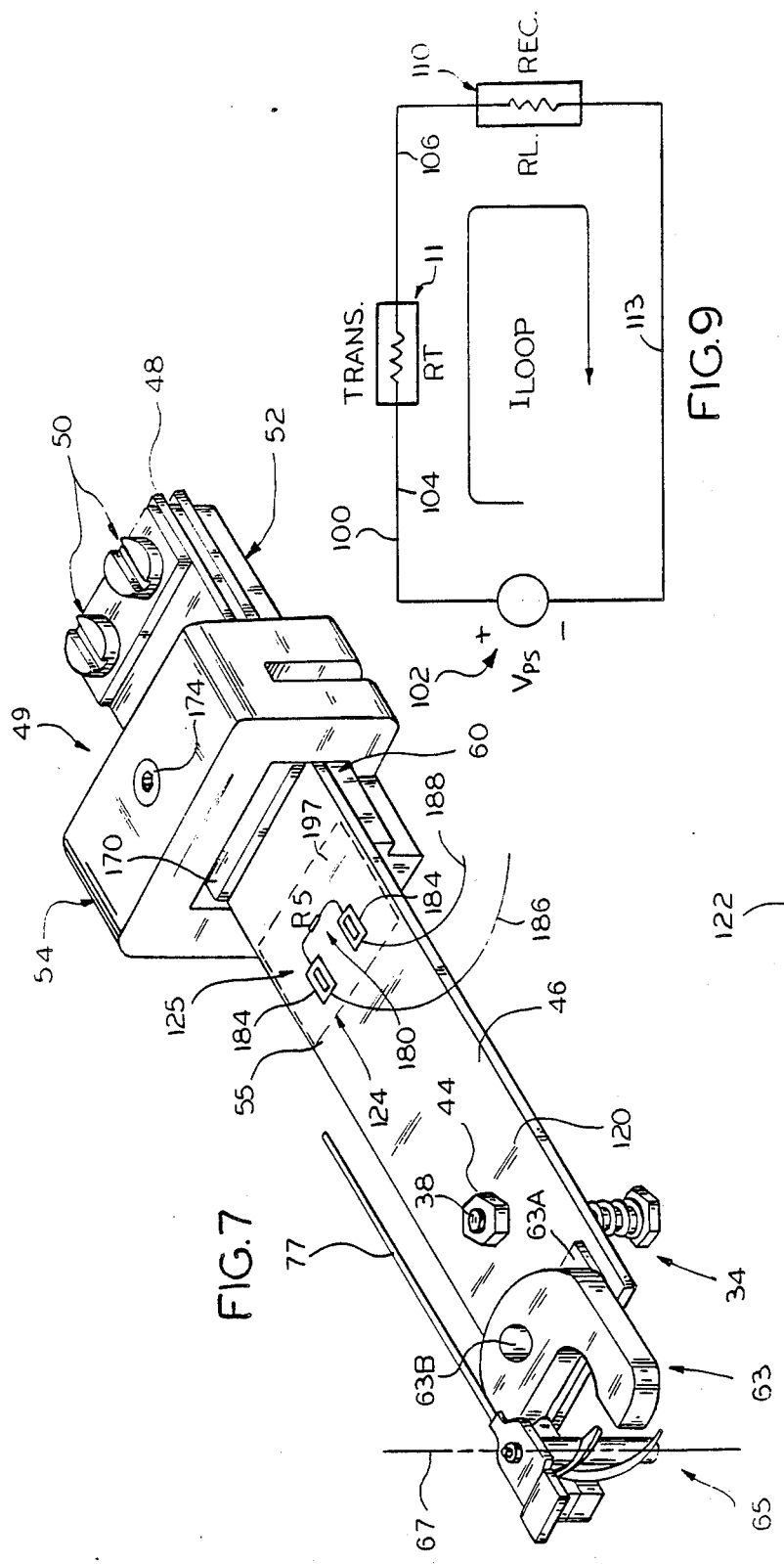
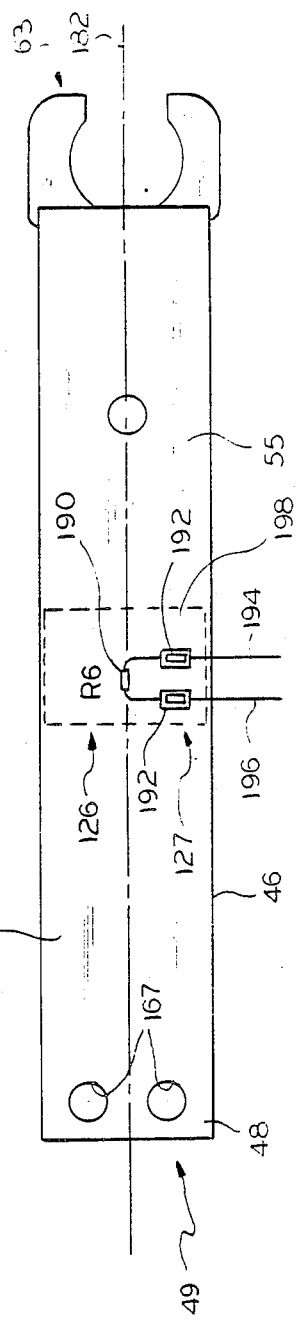

DIFFERENTIAL PRESSURE GAUGE TRANSMITTER

This invention relates to a differential pressure gauge transmitter, and more particularly, to a device for accurately measuring and providing an analog pneumatic display of the pressure differentials between gas or air pressure at high and low pressure sources, and also provide an electrical signal that, when the transmitter is incorporated in a control loop, may be employed to control the operation of commercial and industrial energy management systems, or be employed wherever measurement and/or control of differential pressures is needed.

Heretofore analog indication of the gauge pressure of air or other gas at a specific measuring site of interest, or the differential pressures of air or other gases at two sources of such pressure, again at a specific measuring site, has been provided by an instrument known as a differential pressure gauge, which involves the instrument housing having a flexible diaphragam, that may be circular, defining a pressure cavity into two chambers, a high pressure side and a low pressure side. The instrument includes a leaf spring of fixed length mounted cantilever fashion in the instrument to one side of and spaced from the diaphragm, with the diaphragm and the leaf spring live length being connected by a link disposed at and centered on the axial center of the diaphragm with the free end of the leaf spring carrying a magnet that is in magnetic attraction relation to a helix journaled in the instrument to rotate about its longitudinal axis, which is essentially in parallelism to the axis of the diaphragm-leaf spring link. The helix aligns itself with the magnetic field of the magnet by rotating according to the position of the magnet longitudinally of the axis of the helix, with a gauge pointer needle or indicator arm being fixed with respect to the helix and rotating with it; gauge pressure, or differential pressure, is read by viewing the deflection of the device indicator arm against the background scale forming a part of the instrument that includes a zero datum. For an illustration of devices of this type, reference is made to Dwyer U.S. Pat. No. 2,722,837, Locke U.S. Pat. No. 3,091,123, and Phillips and Troyer U.S. Pat. Nos. 4,011,759 and 4,030,365, for example.

A strain gauge transducer, on the other hand, may be part of an instrument of this general type that does not have analog indication of pressure, and in which the instrument leaf spring is part of a strain gauge transducer associated with an electronic circuit that is mounted on a printed circuit board and housed within the instrument housing, which circuit is energized from a conventional and external, readily available regulated power supply to provide a device that, when deflection of the diaphragm and leaf spring actuated thereby occurs, results in the provision of a milliamp output in the range of from about four to about twenty milliamps that may be transmitted to a receiving process controller, indicating meter, or a computer; see, for instance, Phillips and Dirks U.S. Pat. No. 4,385,525.

Instruments for the measuring and analog indication of gas or air pressures, which may be gauge or differential, find many uses, such as to check air filters for servicing needs to sense the static pressure of an airstream, to measure air velocity, to determine flow by measuring flow drop, to monitor the operation of engine or compressor air filters, etc. Successful devices of this type are represented by the Magnehelic, Minihelic, and Capsuhelic lines of gauge products offered by the assignee of the present invention, Dwyer Instruments, Inc., of Michigan City, Ind.

In this connection, the transmitter of this invention has its major utility in connection with matter in the gaseous state, which necessarily involves both air and other gases, separately or mixed.

A principal object of the present invention is to provide, for incorporation in electrical process control loops, that are employed to series connect an external electrical power source, a test site transmitter, and a fixed resistance receiver (such as a system controller, a computer, or a loop current indicator), a transmitter that combines local analog pressure indication with the familiar four-twenty milliamp output for remote control, record keeping and/or indication, which can continue to indicate local gauge or differential pressure when the electrical supply involved is interrupted.

Another major object of the invention is to provide a transmitter strain gauge transducer arrangement in which the transducer leaf spring has mounted on each side of same, along the free length of the leaf spring, strain gauge sensing means comprising in each case a generally rectilinear silicon sensor strip, with the strip of one side of the leaf spring member being parallel to the longitudinal axis of the leaf spring, and the sensor strip of the other side of the leaf spring being perpendicular to the longitudinal axis of the leaf spring.

Yet another object of the invention is to provide a pressure transmitter that may be employed to sense either gauge or differential pressures, that is arranged for both local analog indication of the pressure or differential pressures measured, as well as an output current that, when the transmitter is incorporated in an electrical control loop circuit of the type indicated hereinbefore, provides remote control, recording keeping, and/or indication, which instrument is composed of few and simple parts, that is inexpensive of manufacture, and that is long lived in use.

In accordance with the present invention, a pressure transmitter device is provided for in cooperation in the familiar electrical control loop circuit for providing both analog and pneumatic display of the pressure or differential pressure involved locally of the instrument, as well as transmission therefrom to the indicated current control loop of a four-twenty milliamp signal that is directly proportional to any changes in pressure involved.

Analog indication is provided by the general arrangement of the instrument itself wherein a flexible diaphragm that may be circular and defines a pressure cavity of the instrument into two chambers, namely a high pressure chamber and a low pressure chamber. A leaf spring of fixed length is cantilever mounted along one side of the diaphragm with the leaf spring extending substantially normally of the central axis of the diaphragm. The fixed end of the leaf spring is adjustably clamped in place, to define the live length of the leaf spring, which extends across the central axis of the diaphragm, and its free end mounts a magnet that is in magnetic relation with a helix journaled in the instrument. A link extends between the leaf spring and the diaphragm such that when the instrument high and low pressure chambers are connected to measure either gauge pressure or differential pressures, the resulting pressures will cause the diaphragm to move along its said central axis, which moves the leaf spring with respect to the helix accordingly. The helix aligns itself with the magnetic field by rotating about the axis on which it is journaled according to the position of the leaf spring relative to the diaphragm. The helix has a pointer arm affixed thereto and that thus rotates with it, with pressure being read analog fashion by viewing deflection of the needle from a zero datum on a background scale visible through the face of the instrument.

In accordance with the invention, the instrument leaf spring is arranged in special strain gauge fashion and has strain gauge sensing means incorporated on either side of same that are in the form of two generally rectilinear silicon sensor strips, with the strip of one side of the leaf spring being parallel to the longitudinal axis of the leaf spring, and the strip of the other side of the leaf spring being perpendicular to the longitudinal axis of the leaf spring.

The sensing means of the instrument leaf spring are incorporated in an electronic circuit mounted within the instrument housing that includes means for supplying a constant current to the sensing circuit and means for adjusting the strain gauge signal generated by the deflection of the instrument leaf spring from its deflection free relation thereof to an output that in effect senses the action of the pressures acting on one or both sides of the diaphragm by way of the strain gauge sensing means, with the electronic circuit producing a millivolt output proportional to the pressure change that has occurred, with this output voltage being conditioned by an integrated circuit chip that provides the necessary four-twenty milliamps of current that is applied to the power loop circuit for application to the loop circuit receiver, such as the indicated controller, computer, etc.

Other objects, uses, and advantages will be obvious or become apparent from a consideration of the following detailed description and the application drawings in which like reference numerals indicate like parts throughout the several views. In the drawing:

FIG. 3 is a substantially enlarged transverse cross-sectional view through the instrument, taken substantially along line 3—3 of FIGS. 1 and 2;

FIG. 4 is a fragmental cross-sectional view taken substantially along line 4—4 of FIG. 1;

Figure 10:
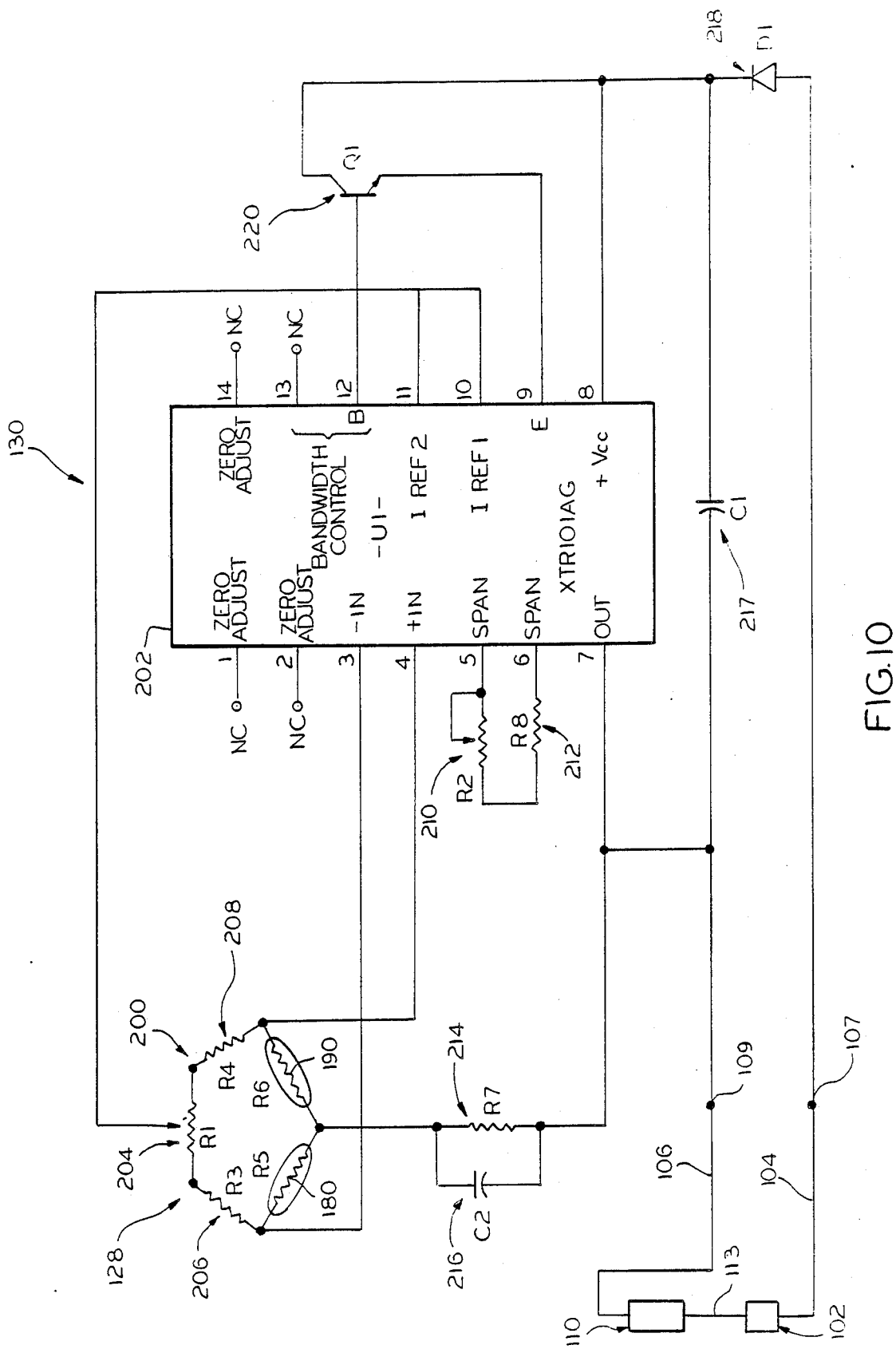

FIG. 5 is a top plan view of the instrument, with the gauge cover removed, and with the instrument wishbone and associated electronic circuit and circuit board displaced from the instrument and in an upside down position relative to the application of these components to the instrument as shown in FIG. 3, with the electrical connections of the instrument terminals and leaf spring strain gauge sensing means to the circuit board being diagrammatically illustrated;

FIG. 6 is an top side plan view of the instrument wishbone, with the circuit board and associated parts omitted;

FIG. 7 is a diagrammatic perspective view illustrating the instrument leaf spring and associated parts, including the leaf spring magnet, the helix and its indicating arm, as well as the strain gauge sensing means that is applied to the leaf spring upper side as viewed from the face of the instrument;

FIG. 8 is a plan view of the underside of the leaf spring showing the magnet applied thereto and the strain gauge sensing means that is applied to the underside of the leaf spring, in accordance with the present invention;

FIG. 9 diagrammatically illustrates the control loop circuitry that the transmitter of the present invention is to be incorporated in; and FIG. 10 diagrammatically illustrates the transmitter electronic circuitry, as arranged in accordance with the present invention.

However, it is to be distinctly understood that the drawing illustrations referred to are provided primarily to comply with the disclosure requirements of the Patent Laws, and that the invention is susceptible of modification and variations that will be obvious to those skilled in the art, and that are intended to be covered by the appended claims.

GENERAL DESCRIPTION

Figure 1:
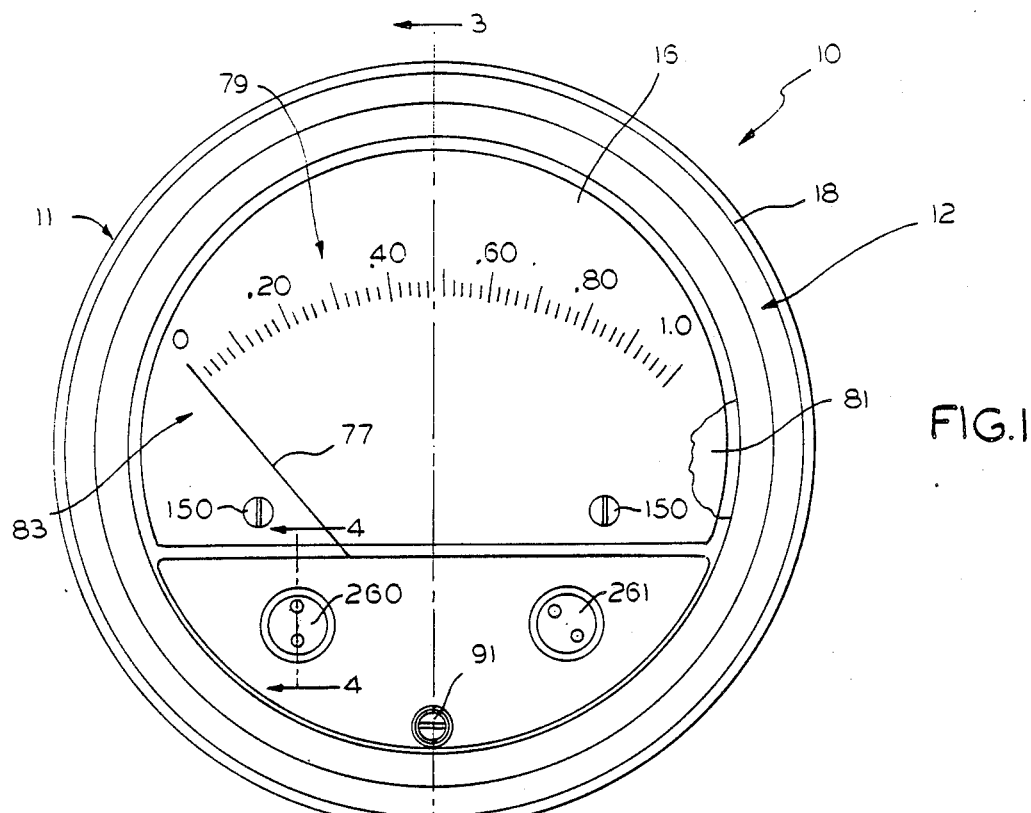
FIG. 1 is a face or top plan view of one embodiment of the invention taken as viewed by an observer viewing the instrument from one left hand side of FIG. 3, with parts broken away.
Figure 2:
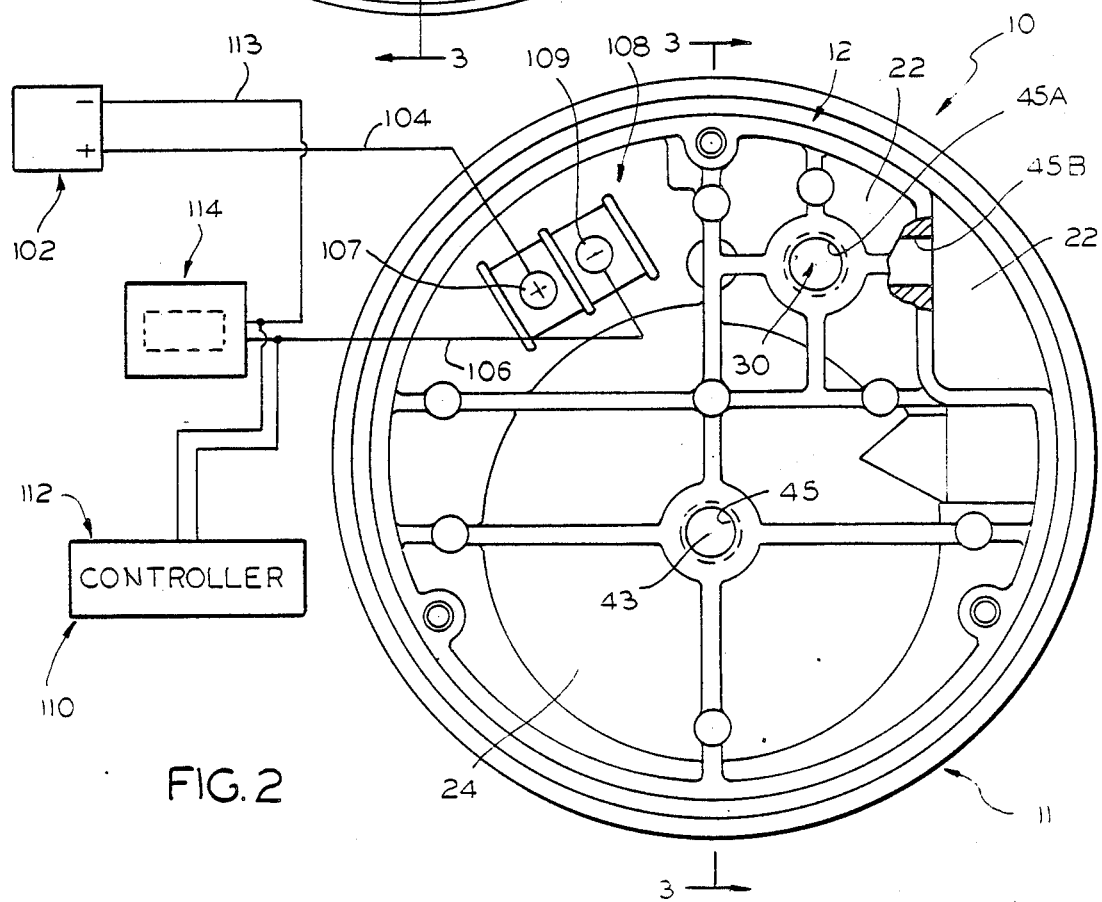
FIG. 2 is a rear elevational view of the instrument, showing also in two wire circuit form and diagrammatically, an external power source and a two wire connection arrangement of the transmitter into a two wire control loop (see FIG. 9) that is connected to the control loop receiver shown diagrammatically in FIG. 2 in the form of a controller and a digital readout device.

Reference numeral 10 of FIGS. 1-3 generally indicates one embodiment of the pressure transmitter of this invention, which comprises a gauge or instrument 11 that includes a housing member 12, that may be formed from a suitable metallic material, such as aluminum or aluminum alloy, having an open end 14 (see FIG. 3) closed by a transparent cover 16 to form the instrument pressure cavity 17. Cover 16 is preferably formed from a transparent rigid high strength plastic material, such as acrylic, or a polycarbonate, and is held in place on the instrument by annular cap or bezel 18 (that may be formed from the same material as the housing member 12) threadedly secured to the housing member 12 as indicated at 20 (see FIG. 3).

The housing member 12 defines a rear wall 22 defining a saucer-shaped portion 24, which in the form illustrated, forms a stationary wall for low pressure chamber 26 that is defined from cavity 17 by flexible diaphragm 28 that is suitably mounted in place at its rim 29 to define a high pressure chamber 30 on the other side of same. The diaphragm 28 is preferably formed from a silicon rubber or its equivalent, and in the form illustrated, is fastened between reinforcing plates 31 and 32 concentric with, and located at the center of the diaphragm 28, with connecting link 34 comprising, for instance, a conventional spring link 36 having its ends threaded onto the oppositely facing studs (not shown) of conventional composite end fittings 38 and 40 that have the respective oppositely projecting threaded stud portions 38A and 40A that are respectively integral with the respective hex flange portions 38B and 40B; the nut 42 is applied to the stud portion 40A to clamp plates 31 and 32 between same and flange portion 40B, at fitting 40, so as to clamp the diaphragm 28 in leak free relation. At the central axis 43 of the housing saucer portion 24 (see FIG. 2) the usual threaded socket 45 is formed that provides the usual connection of the housing member 12 of the transmitter low pressure chamber 26 with a source of low fluid pressure (in the form illustrated).

Operably associated with the diaphragm 28 is range spring 49 in the form of leaf spring 46 that is cantilever mounted at its end 48, as by employing suitable screws 50, which are applied to the housing member rear wall 22 in such a manner as to clamp the end 48 of the leaf spring 46 against the housing mounted slide structure 52 which mounts the U shaped clamp 54 for adjusting the live length 55 of the spring 46, as per the arrangement disclosed in Locke U.S. Pat. No. 3,397,319.

The nut 44 is applied to the said portion 38A and against the leaf spring 46 (through which the spring link 36 thus passes) and fitting flange portion 38B to connect the link 34 and thus the diaphragm 28 to the leaf spring 46 to form a motion transmitting connection between the live length 55 of the leaf spring 46 and the diaphragm 28, which will thus swing the live length 55 of the leaf spring 46 about fulcrum 60 that is established by the action of the clamp 54 on leaf spring 46. The instrument illustrated in FIGS. 1-8 is to normally operate with the spring link 36 in tension, but as link 34 comprises helical spring link 36, the gauge involved is of the zero center type, and thus the read out provided depends on what side of the diaphragm the high pressure is on; also, the movement of the diaphragm 28 is allowed, by using spring link 36, to be essentially rectilinear rather than the arcuate motion that would be involved if a rigid link were employed between the diaphragm 28 and the leaf spring 46.

The general arrangement of the housing member 12 and the mounting of the diaphragm 28 may be substantially as disclosed in said U.S. Locke Pat. No. 3,397,319, with the diaphragm 28 at its margin 29 being formed with a continuous bead 62 that is received in the housing groove 64 that is formed about the housing member saucer shaped portion 24 in concentric relation thereto; bead 62 is held in place by the saucer shaped plate 66 being secured against the diaphragm margin 29 and its bead 62 by suitable lock ring 68 applied to circular recess 70 formed in the housing member 12.

As indicated in FIGS. 3, 5, 7 and 8, the leaf spring 46 at its free end 51 suitably mounts magnet 63, on suitable mounting pad 63A, that is of the familiar "horse shoe" configuration that is disposed in operative magnetic coupling relation to helix 65 that is journaled for rotation about its longitudinal axis 67, by application to suitable bearings 69 and 69A in a support frame 71, that is known in this art as a "wishbone", which wishbone 71 is cantilever mounted at its familiar leg portions 73 by appropriately secured to the housing member 12, as by employing suitable screws, to support the helix 65 for pivotal movement to the right or to the left of FIG. 1 relative to the housing member 12 (such screws being turned into suitable threaded apertures 75A formed in the respective pedestal lands 75B and 75C of housing member 12, and of course, passing through suitable apertures 75 formed in the respective wishbone legs 73). Magnet 63 may be held to strip 63A by suitable rivet 3B, with strip 63A suitably bonded or adhered to leaf spring 46. While this is diagrammatically illustrated in FIG. 3, see Locke U.S. Pat. Nos. 3,091,123 and 3,397,319. The helix 65 fixedly carries a pointer arm or indicator 77 that has the function of cooperating with the scale 79 (see FIG. 1) that is suitably formed on dial plate 81 to give in an analog manner the desired pressure reading with reference to a datum zero 83. As indicated, the position of the indicator or pointer arm 77 will change relative to the scale plate 81 to give a numerical reading on the scale indicia there indicated. As disclosed in, for instance, the Locke patents referred to, the helix 65 moves in this manner on movement of the magnet 63 upwardly or downwardly of FIG. 3 under the action of, for instance, differential pressures in the instrument high and low pressure chambers, or on movement of the wishbone 71 by operation of the zero adjust device 85, the specifics of which are disclosed, for instance, in Phillips and Troyer U.S. Pat. No. 4,030,365, the device 87 being conventionally used to set the indicator 77 on the dial zero datum mark, as by rotating adjustment screw 89 at its externally exposed head 91.

The housing member 12 rear wall 22 is suitably formed to define alternate, right angle oriented, high pressure threaded sockets 45A and 45B for alternate use by the installer of the transmitter 10, which define high pressure inlets to the high pressure chamber 30, with the unused socket 45A or 45B being closed by a conventional tapered threaded plug when not in use. As is well known in this art, the transmitter 10 has its low and high pressure chambers 26 and 30 separately connected to separate sources of low to high gas or air pressure by the usual tubing equipped at its ends with the usual fittings (not shown). While the transmitter 10 is disclosed in use and control of differential pressures, as is well known in this art, positive gauge pressures may be similarly measured and regulated by venting the low pressure chamber to atmosphere and connecting the positive pressure source to the desired high pressure socket 45A or 45B. Negative gauge pressures are measured and regulated in a similar but opposite manner by venting the high pressure chamber to atmosphere and connecting the negative pressure source to the desired low pressure socket 45 (the appended claims are intended to cover such an alternate use of transmitter 10).

In accordance with the present invention, the transmitter 10, in addition to the analog display of differential pressure that is locally available at the face of the instrument 11 (see FIG. 1), the transmitter 10 is to be incorporated in the control loop circuiting 100 diagrammatically illustrated in FIG. 9 in which a suitable external power source 102 delivers electrical power to the control loop 100 that may have a voltage in the range from about 12 to about 35 DC, with a minimum current capability of 40 milliamps. The transmitter 10 as incorporated in the loop 100 utilizing the leads 104 and 106 (see FIGS. 2 and 10) that extend from suitable plug assembly 108 of the transmitter 10. Assembly 108 involves contacts 107 and 109 that are conveniently labeled positive and negative (as is diagrammatically illustrated in FIG. 2), with the external power source 102 being series connected to transmitter 10, and transmitter 10 being series connected to receiver 110, with the receiver 110 in turn being series connected back to the power source 102. The so-called "receiver" will have a resistance of fixed value and may comprise a controller 112, or a digital read out device 114, or a computer (not shown) or other record keeper, depending on the choice of the installer, whereby the control loop 100 by way of the transmitter 10 provides electronic operation of the two wire control loop 100 for remote control or monitoring purposes (which may be remote both from the transmitter 10 and the sources of high and low pressure that are connected to the transmitter).

For this purpose, a strain gauge arrangement of the type disclosed in the aforementioned Phillips and Dirks U.S. Pat. No. 4,385,525 may be employed, with the specific arrangement involved of the present application disclosure being significantly different and being diagrammatically illustrated in FIGS. 5-8 and 10. This involves the leaf spring 46, and specifically its live length 55, having fixed to its upper side 120 (as viewed in FIG. 3) a special strain gauge sensor 124, and with the underside 122 of the strain gauge also having a similar strain gauge sensor 126 applied thereto, with the sensors 124 and 126 being of the specific type, having the specific orientation described hereinafter, and forming separate strain gauges 125 and 127.

The sensors 124 and 126 are incorporated in a Wheatstone bridge in the manner indicated diagrammatically in FIG. 10 (that will be discussed in detail hereinafter) that forms an electro-mechanical transducer 128 that is powered by electronic circuit 130 applied to circuit board 132, with the latter being suitably affixed to the underside 133 of wishbone 71, as by employing suitable screws also applied to a dielectric area of the circuit board 132, with an insulator plate 134 (see FIG. 5) being applied therebetween.

As will be apparent from the showing of FIG. 3, the circuit board 132 is applied to the housing member 12 in overlying relation to and spaced from the leaf spring 46 so as to not interfere with the deflection of the leaf spring live length 55 that are effected by the deflections of the diaphragm 28.

The electronic circuit 130 and its components and connections are diagrammatically and schematically illustrated in FIGS. 5 and 10, with the connections of the electronic circuit 130 leading to the instrument external electrical plug assembly 108 to which lead 104 extends from power source 102 for connection to the various components making up the receiver 110; lead 113 returns from the receiver 110 to the power source 102 (see FIGS. 2 and 9).

As will be made clear from the specific description that follows, the electronic circuit 130 functions to supply a constant direct current to the strain gauges 125 and 127 formed by the sensors 124 and 126, respectively, in the manner that will be hereinafter disclosed. When the leaf spring 46 is deflected through detection of a differential pressure, which excites the indicated Wheatstone bridge circuit that remains null until there is a change in differential pressure; when the latter occurs, the Wheatstone bridge produces a voltage output proportional to that change, and the latter is conditioned by a integrated circuit chip providing a current in the desired four to twenty milliamp range for use in the loop circuit 100 to operate the receiver 110.

SPECIFIC DESCRIPTION

The scale plate 81 may be of any suitable type, with the indicia 79 set forth in accordance with any convenient but consistent units of pressure, reading from a suitable zero datum 83. In the form shown, the scale plate 81 is suitably affixed within the housing 12 by applying suitable screws 150 into suitable threaded apertures of wishbone 71, such as the apertures 152 formed for this purpose in a body 154 of the wishbone 71.

The wishbone itself may be of any suitable conventional type adapted for the purpose, and thus may be comparable to that disclosed in the Phillips and Zoludow U.S. Pat. No. 3,862,416. In this connection, the bearings 69 and 69A between which the helix is journaled are arranged so that bearing 69 is an adjustable bearing while the bearing 69A is a fixed bearing.

The helix 65 may be of any suitable type, and may be of the twin lobe type disclosed in Phillips and Zoludow U.S. Pat. No. 3,862,416, and the Phillips and Troyer U.S. Pat. No. 4,011,759.

The leaf spring 46 preferably is formed from a suitable tempered spring steel material, such as Sandvik C-1095 hardened and bright tempered spring steel, or the alternate blue tempered version of the same product.

The leaf spring 46 in practice is mounted in its operating position essentially in the manner disclosed in Phillips and Dirks U.S. Pat. No. 4,385,525, as by having the slide bar 52 secured on top of the housing member pedestal forming rib 160 (see FIG. 3), as by employing suitable mounting screw 162, with the leaf spring end 48 being received upper and lower clamping plates 164 and 166 and secured in place by the screws 50 passing through the leaf spring apertures 167 that are shown in FIG. 8 as well as the clamping plates 164 and 166 and slide bar 52 into threaded securement in the respective bores 168 that are formed for this purpose in the housing member 12. At the clamp 54, the leaf spring 46 is received between upper and lower clamping plates 170 and 172, with the lower clamping plate 172 resting on top of the slide bar 52, and set screw 174, that is threadedly received in clamp 54, bearing against the upper plate 170 to clamp the leaf spring 46 against the slide bar 52 and define the live length 55 of the leaf spring and fulcrum 60.

The strain gauges 125 and 127 are best shown in FIGS. 7 and 8, respectively, with the strain gauge 125 on the upper side of leaf spring 46 and comprising a sensor 124 in the form of a silicon strip 180 extending transversely of the leaf spring 46, and thus perpendicular to its longitudinal central axis 182, that is electrically series connected between and with a pair of spaced apart solder pads 184, and that, for the top or upper side 120 of the leaf spring 46, extend substantially parallel to the leaf spring longitudinal axis 182 and are electrically connected into the electronic circuit 130 by the leads 186 and 188.

The strain gauge 127 on the other hand is on the underside 122 of leaf spring 46 and comprises a sensor 126 in the form of a silicon strip 190 that is arranged to extend parallel to the leaf spring longitudinal axis 182, and is connected in series with and between the respective solder pads 192 that are in turn connected into the electronic circuit 130 by leads 194 and 196.

The silicon strips 180 and 190 and their associated solder pads making up the respective strain gauges 125 and 127 are anchored to the leaf spring surface, and coated with a single component acrylic coating of any suitable nature applied within the respective areas 197 and 198 of the respective sides 120 and 122 of the leaf spring 46 that are indicated by the dashed lines of FIGS. 7 and 8.

The sensor strips 180 and 190 and their solder pads are products of Micron Instruments, Inc. of Simi Valley, Calif.

It will thus be seen that when the upper strain gauge strip 180 in being mounted to be perpendicular to the longitudinal axis 182 of the leaf spring 46 receives neither tension nor compression when the leaf spring is subject to bending stress, while the lower or under strain gauge strip 190 in being mounted parallel to the longitudinal axis 182 of the leaf spring 46 is subject to compression on deflection downwardly of FIG. 3 on detection on changes in the differential pressures being sensed. The upper and under strain gauges 125 and 127 comprise two of the four resistive elements in a Wheatstone bridge circuit 200 of circuit 130 comprising transducer 128. The bridge circuit 200 is adjusted, as hereinafter described, to be null until there is a change in resistance by one or more of its resistive elements; once such a change in resistance is detected, the Wheatstone bridge circuit 200 produces a voltage output proportional to that change and this output voltage is conditioned by transmitter chip 202 (see FIG. 10), which is the commercial product XTR 101AG of Burr-Brown Corporation of Tucson, Ariz.

Referring now specifically to FIG. 10, the chip 202 has at pins 10 and 11, reference currents, each of which provides a reference current of 1 milliamp DC. The indicated pins 10 and 11 are electrically connected together generating a single reference current totaling 2 milliamps DC. This reference current (2 milliamps DC.) is routed to Wheatstone bridge circuit 200 made up of four resistive elements, namely the silicon sensors 180 and 190, and fixed resistance resistors 206 and 208, and a bridge balancing potentiometer 204. The potentiometer 204 is connected in wye fashion to the bridge circuit 200 so that resistance may be added to or subtracted from either side of the bridge. The potentiometer 204 is adjusted to set the resistance of each side of the bridge to be an equal amount, dividing the 2 milliamp direct reference current equally between each side of the bridge. When the reference current is divided equally as indicated, the bridge is said to be "null", meaning its output is zero. This condition will hold true as long as the strain gauges 125 and 127 remain planar.

The output of bridge 200 is connected to pins 3 and 4 of the transmitter chip 202, these pins being the signal input terminals of the chip 202. The differential voltage produced by the Wheatstone bridge circuit 200 in conjunction with the value of the resistance between chip pins 5 and 6 controls the current span of the transmitter to the control loop 100 (which in this art is the industry standard 4-20 milliamp output).

The series combination of the potentiometer 210 and the fixed resistor 212 provide the resistance for setting the span or gain of chip 202; potentiometer 210 is adjusted so that the current span for the full scale input signal is equal to 16 milliamps direct current. Extremely low values of span resistance provide high gain conditions in the chip 202, so resistor 212 is used to prevent the series combination from reaching zero resistance.

Resistor 214 is inserted into the reference current loop to bias the reference current signal inputs at chip pins 3 and 4 to be approximately 5 volts above that of pin 7. This is to assist in insuring a linear response. Capacitor 216 is connected in shunt with resistor 214 and serves to surpress transient voltages in the reference current loop. The reference current, after passing through resistor 214, joins the output of the chip 202, at the chip pin 7. The combination of the 2 milliamp reference current and the output of the chip pin 7 form the desired 4 to 20 milliamp direct current signal that is supplied to the control loop 100 from the transmitter 10. It is to be noted that the circuit referred to does not actually generate its own 4-20 milliamp loop current, but effectively adjusts a series loop resistance to draw from 4 to 20 milliamps in a loop, based on the voltage of the loop power source 102 and the input parameters as controlled by a given process sensor 190, as in a true two wire transmitter loop.

Additional components are also to be found in the circuit of FIG. 10 which enhance performance. Capacitor 217 functions as a bypass for the voltage supply on chip 202, and is connected at pins 7 and 8 which are respectively the current out and the +Vcc pins. The diode 218 serves as a reverse polarity protector on the "+" or the "loop current in" terminal 108, so that current will only flow forward into the chip 202 as required. When the circuit is improperly connected, the junction of diode 218 is reverse-biased, and will not permit current to flow within any portion of the circuit 128, thus avoiding costly component damage. Transistor 220 is an optional component of the circuit, the function of which is to share current with an internal transistor (not shown) inside the chip 202 in order to reduce internal heat change within the chip package. This improves the linear response of chip 202 as minimum and maximum input signals cause the output current to span from 4 to 20 milliamps.

As indicated, strain gauges 125 and 127 are mounted on the opposite sides of leaf spring 46, with strip 190 being mounted on the underside or bottom of leaf spring 46 in parallelism to the longitudinal axis 182 of the leaf spring 46 and to tension and compression forces that act on the leaf spring 46 underside when the leaf spring is deflected. Under normal operating conditions of transmitter 10, leaf spring deflection results in strip 190 becoming slightly compressed. This compression increases the effective cross-sectional area of the strain gauge 127 thus decreasing the value of its resistance. The strip 180 of strain gauge 125 is mounted on the opposite side of the leaf spring to extend perpendicular to the leaf spring longitudinal axis 182 and thus to the direction of action of the tension and compression forces. Under normal deflection of the leaf spring 46, the mechanical stresses acting on strip 180 are insignificant when compared to the stresses in gauge 190. Since both gauges 125 and 127 are constructed of silicon, changing thermal conditions will play a significant role in the value of their intrinsic resistances. Varying ambient temperatures will produce forces that can expand and contract the strain gauges 125 and 127 enough to change their resistance, shifting the null and span. Ideally, strips 180 and 190 will increase or decrease equally in resistance simultaneously, depending on the change in ambient temperature. This is due to their close proximity, and should not offset the output signal of the Wheatstone bridge 200 when excited. However, the construction of the individual strain gauges 125 and 127 having the strips 180 and 190 is not alike, so stresses induced by thermal expansion and contraction in the specific strips 180 and 190 employed will not be identical. This will cause them to change their resistances at slightly different rates, producing a thermal error, or output temperature drift. The need for using two such strain gauges to temperature compensate the bridge becomes apparent when examining thermal expansion and contraction forces. Both strain gauges 125 and 127 of an individual leaf spring 46 working in conjunction with each other are to provide approximately equal excitation current division during an ambient temperature change, thereby preventing large null and span offsets. This minimizes the Wheatstone bridge output signal error produced by the heretofore referred to thermal drift. Using only one such strain gauge in the bridge 200 would not compensate for temperature and would produce an unacceptable shift in null and span; the error occurs due to the unbalance in bridge excitation current as a change in temperature will increase or decrease the resistance of only one side of the bridge creating the indicated unbalance. This condition happens whether or not the strain gauge involved remains planar.

During normal operation of the transmitter 10, as installed as herein disclosed and incorporated in a control loop 100, when the instrument leaf spring 46 deflects, the change in pressure (normally on the high pressure side of the instrument) results in compressing strain gauge 127, and namely its strip 190, which thus increases its cross-sectional area and thereby decreases its resistance. Since the strain gauge 127 is part of the bridge 200, a larger share of excitation current will flow through the strain gauge 127 and the resistor 208, creating a differential voltage at the output of the bridge. This bridge output signal is linearly proportional to the decrease in resistance of the strain gauge 127, and is fed to the signal input terminals at pins 3 and 4 of chip 202. Chip 202 is internally arranged for the instrument operator to select the appropriate current for control loop 100 and a resistance value of the span potentiometer 210.

The potentiometers 204 and 210 are adjusted on installation of the instrument 10 as a transmitter by utilizing the knobs 260 and 261, which are arranged in the manner disclosed in Phillips and Dirks U.S. Pat. No. 4,385,525, to suitably couple knob 260 to potentiometer 204 and suitably couple knob 261 to potentiometer 210. Thus, the knobs 260 and 261 are keyed to a planar shank 264 adapted to fit into a socket or slot in the rotatable component of the respective potentiometers 204 and 210, forming a spline connection that is similar to the corresponding spline connection of said Phillips and Zoludow U.S. Pat. No. 3,862,416 (see FIG. 11 of same). A conventional dual pronged tool (not shown) may be employed to appropriately rotate knobs 260 and 261 as needed to balance the instrument, and in particular bridge 200.

The instrument 11 is provided with suitable 0-rings 270, 271, and 272 for sealing purposes.

The wishbone 71 is excised as at 280 and 281, respectively, to accommodate the potentiometers 204 and 210, respectively, on assembly of the instrument 11.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

What is claimed is:

1. In a control loop for process control including an external power source connected in series to an indicating transmitter that is in turn series connected to a load resistance of fixed value that is in turn series connected to the external power source, the improvement wherein the indicating transmitter comprises:

a pressure gauge that comprises a housing having a pressure cavity across which is mounted a flexible diaphragm separating high and low pressure chamber, a helix journaled in said housing for rotation about its axis, with the helix having an indicator connected thereto, a leaf spring secured to the housing cantilever fashion adjacent one end thereof in overlying relation to said diaphragm on one side of said diaphragm, and having a magnet mounted on the other end thereof, said magnet producing rotational movement of said helix in response to linear movement of said magnet longitudinally of said helix axis, said securement of said leaf spring to said housing being by clamping means for clamping said leaf spring to define the live length of same and a fulcrum about which said live length moves, a link connecting said diaphragm to said live length of said leaf spring for deflection of said leaf spring in response to differential pressures acting on either side of said diaphragm, said live length of said leaf spring having a strain gauge mounted on each side thereof, said strain gauges each comprising a sensing element in the form of a generally rectilinear silicon sensor strip, with the strip of one side of said leaf spring being parallel to the longitudinal axis of said leaf spring, and the strip of the other side of said leaf spring being disposed normally of said longitudinal axis of said leaf spring, said strain gauges being electrically connected in Wheatstone bridge, self temperature compensation, fashion, and in an electronic circuit mounted in said housing with the sensing elements of said bridge being balanced when the diaphragm and leaf spring are free of deflection, a circuit board fixedly mounted in said housing on said one side of the diaphragm and overlying and spaced from said leaf spring in substantial parallelism thereto, said electronic circuit being mounted on said circuit board and including means for supplying a constant DC current to said strain gauges and means for amplifying the strain gauge signal generated by deflection of said leaf spring live length from the deflection free relation thereof to an output for effecting sensing of the action of the differential pressures acting on either side of the diaphragm.

2. The improvement set forth in claim 1 wherein: said strain gauge signal is proportional in the pressure signal sensed by said diaphragm in deflecting said leaf spring live length from said deflection free relation thereof to provide said output.

3. The improvement set forth in claim 1 wherein: said electronic circuit includes a first manually settable potentiometer means for setting the operating range of the gauge, and a second manually settable potentiometer means for setting the gauge zero adjust when the diaphragm and leaf spring are free of deflection, whereby said output approximates four milliamps.

4. The improvement set forth in claim 1 wherein: said housing is formed for separately connecting said high and low pressure chambers to sources of high and low pressure fluids, respectively.

5. In a strain gauge pressure transducer, a housing having a pressure cavity across which is mounted a flexible diaphragm separating high and low pressure chambers, a leaf spring secured within the housing high pressure chamber in overlying relation to the diaphragm on one side of the diaphragm and being mounted cantilever fashion at one end thereof, clamping means for clamping said leaf spring to said housing adjacent said one end thereof for defining the live length of said spring and a fulcrum about which said spring live length moves, and a link connecting said diaphragm to said live length of said leaf spring for deflection of said leaf spring in response to differential pressures acting on either side of the diaphragm within the housing, with the leaf spring having strain gauge sensing means incorporated in an electronic circuit mounted inside the housing that includes means for supplying a constant current to said circuit and means for adjusting the strain gauge signal generated by the deflection of said leaf spring from the deflection free relation thereof to an output for effecting sensing of the action of the differential pressures acting on either side of the diaphragm, the improvement wherein:
the strain gauge sensing means comprises a strain gauge on each side of the live length of the leaf spring,
said strain gauges each comprising a generally rectilinear silicon sensor strip anchored to the respective side surfaces defined by the leaf spring along its live length;
with the strip of one side of the leaf spring being parallel to the longitudinal axis thereof and the strip of the other side of said leaf spring member being perpendicular to said longitudinal axis thereof,
said strips being electrically connected in a Wheatstone bridge, in a self temperature compensated fashion,
said bridge being electrically connected to the electronic circuit mounted in said housing in controlling relation to the circuit, and said bridge being balanced when the diaphragm and leaf spring are free of deflection.

6. The improvement set forth in claim 5 wherein:
a circuit board is fixedly mounted in said housing on the one side of the diaphragm and overlying and spaced from the leaf spring is substantial parallelism thereto,
with the electronic circuit being mounted on said circuit board and including means for supplying a constant DC current to said strain gauges and means for amplifying the strain gauge signal generated by deflection of the leaf spring live length from the deflection free relation thereof to an electrical output for effecting sensing of the action of the differential pressures acting on either side of the diaphragm.

7. The improvement set forth in claim 6:
including means for effecting mechanical analog indication by the transducer of the pressures acting on either side of the diaphragm,
with the transducer having a face equipped with a scale for readout of said analog indication.

* * * * *